United States Patent [19]

Read

[11] Patent Number: 4,825,156
[45] Date of Patent: Apr. 25, 1989

[54] SIGNAL DETECTOR FOR CYCLE COMPUTER WITH RELEASABLE STRAP FRAME MOUNTING

[75] Inventor: Robert Read, Bartlett, Ill.

[73] Assignee: Schwinn Bicycle Company, Chicago, Ill.

[21] Appl. No.: 175,116

[22] Filed: Mar. 30, 1988

[51] Int. Cl.⁴ .............................................. G01P 1/02
[52] U.S. Cl. ................................... 324/166; 292/318; 24/16 PB
[58] Field of Search ................... 70/30, 49 XR, 57, 58, 70/233; 324/166, 168; 24/16 PB XR, 16 R, 30.5 P, 704; 292/318

[56] References Cited

U.S. PATENT DOCUMENTS

Re. 31,689 10/1984 Bulanda et al. ................... 24/16 PB
4,352,063 9/1982 Jones et al. ........................... 324/168

Primary Examiner—Stewart J. Levy
Assistant Examiner—Michele Simons
Attorney, Agent, or Firm—McCaleb, Lucas & Brugman

[57] ABSTRACT

A signal detector for a cycle computer comprises a head, a sensor supported by the head, and a flexible strap having one end connected to the head. The head includes a housing having a curved abutment surface shaped to bear against the curved abutment surface of a support tube such as a leg of a bicycle fork or a rear stay tube. The head has a strap-guiding surface defining one wall of a strap-receiving passageway extending completely through the housing and tangent to the curved abutment surface. The passageway has a strap entrance portion adjacent the curved abutment surface and a strap exit portion remote from it. The strap has transverse teeth along the inside surface facing inwardly into the passageway when the strap extends through it. In the embodiment disclosed, the head is molded of plastics material and includes an integral pawl in the passageway. The pawl has a tooth which is elastically biased into locking engagement with the teeth on the strap which are in the form of ratchet surfaces enabling easy insertion of the strap and blocking withdrawal. The exit portion of the strap-receiving passageway is enlarged to receive a tool such as a screwdriver for disengaging the tooth on the pawl from the teeth on the strap to enable easy withdrawal of the strap.

3 Claims, 1 Drawing Sheet

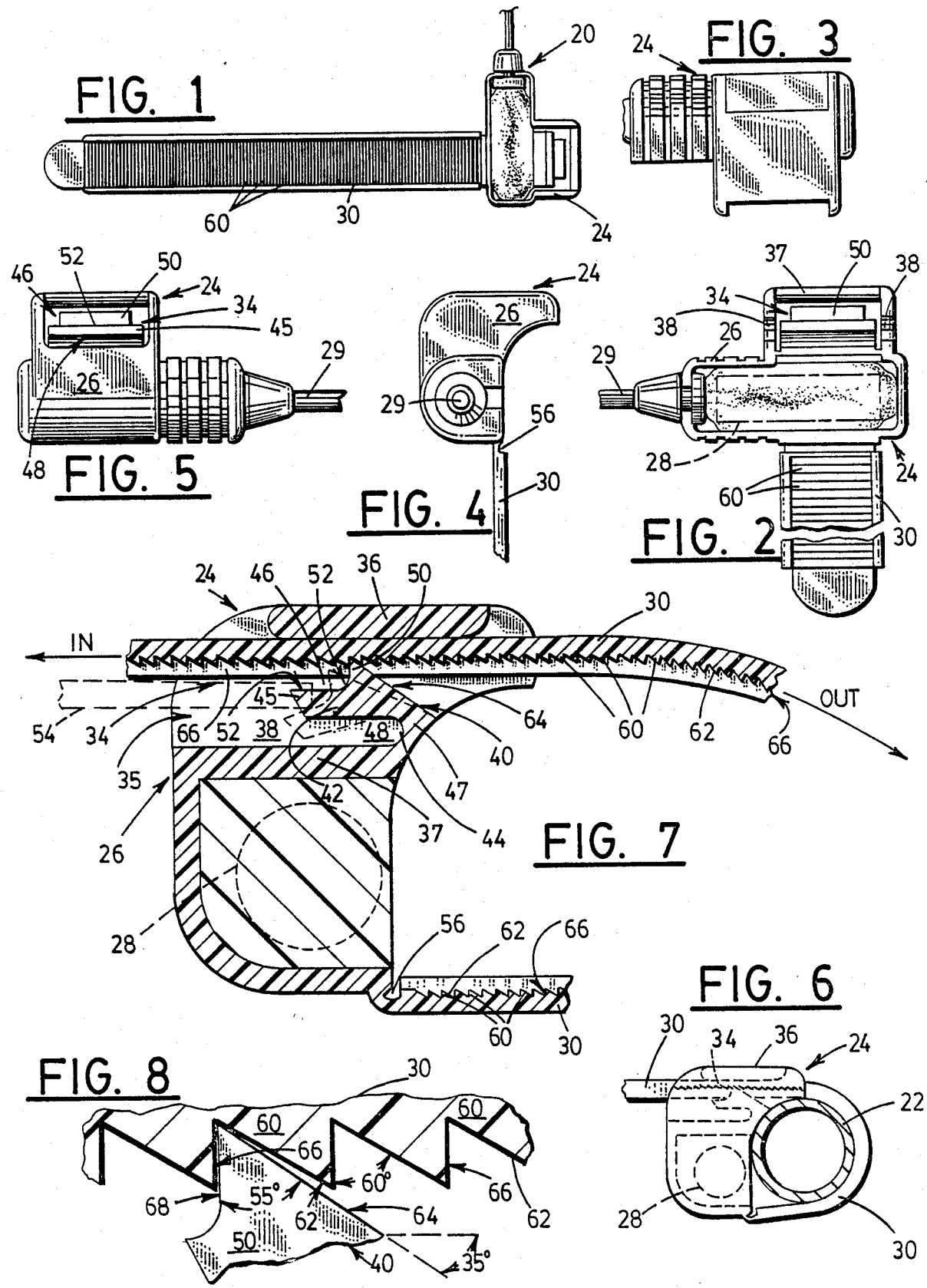

SIGNAL DETECTOR FOR CYCLE COMPUTER WITH RELEASABLE STRAP FRAME MOUNTING

BACKGROUND OF THE INVENTION

This invention belongs to the field of electronic cycle computers. Typically, these computers comprise a compact, lightweight housing with a display screen and a clamp for mounting it on a bicycle handlebar, one or more orbitally movable magnets carried by the spokes on the front or rear wheel, and a signal detector mounted on one of the front fork tubular legs or a rear stay tube at a position adjacent the orbital path of the magnet or magnets. The computer has an inbuilt clock and, based on a known size wheel, processes signals from the detector to display useful information such as current and maximum speeds, distance traveled, and current and elapsed time.

BRIEF SUMMARY OF THE INVENTION

It is a general object of the present invention to provide a releaseable signal detector for a cycle computer which is attachable to a leg of a bicycle front fork or a rear stay tube by a releaseable strap.

Another object is to provide such a signal detector in the form of a head, a sensor in the head, and a flexible strap having a fixed end connected to the head and a free end extendible through a strap-receiving passageway in the head.

Another object is to provide such a signal detector having a pawl in the strap-receiving passageway and at least one tooth on the pawl biased to engage teeth on the strap to lock the strap in position to engage the bicycle fork and prevent unintentional release of the strap.

Another object is to provide such a signal detector in which an exit portion of the strap-receiving passageway is enlarged to enable insertion of a tool such as a screwdriver alongside the strap to engage a shoulder on the pawl and move the pawl to release it from the strap teeth to enable easy withdrawal of the strap from the passageway.

Another object is to provide such a signal detector in which the teeth on the strap have ratchet surfaces enabling relatively easy insertion of the strap into the strap-receiving passageway and relatively more difficult withdrawal.

Another object is to provide such a signal detector in which the surfaces of the strap teeth which engage the tooth on the pawl when the strap is inserted are diagonally inclined relative to a line transverse to the plane of the strap, and the surfaces of the strap teeth which engage the tooth on the pawl when the strap is withdrawn are substantially transverse to that plane, and the tooth on the pawl has a profile generally similar to the teeth on the strap.

Another object is to provide such a signal detector in which the pawl is a cantilever member within and extending parallel to the strap-receiving passageway and has a shoulder at its free end engageable with a tool inserted through the exit end portion of the passageway to thereby release the pawl from the strap.

BRIEF DESCRIPTION OF THE DRAWINGS

FIG. 1 is an approximately actual-sized plan view of a sensor for a cycle computer with a strap mounting illustrating a preferred form of the present invention, the inner side of the strap being shown in fully-extended position;

FIG. 2 is an enlarged, fragmentary view of FIG. 1;

FIG. 3 is a top view of FIG. 2;

FIG. 4 is a left side view of FIG. 2;

FIG. 5 is a left side view of FIG. 4;

FIG. 6 is an assembled view of the sensor, releaseably strap-mounted on the front fork of a bicycle;

FIG. 7 is a fragmentary, enlarged cross-sectional view of FIG. 6 showing the releaseable pawl and ratchet teeth on the strap in better detail; and FIG. 8 is a fragmentary, enlarged view of FIG. 7 showing further details of the pawl tooth and stray teeth.

Like parts are referred to by like reference numerals.

DETAILED DESCRIPTION OF THE PREFERRED EMBODIMENT

Referring now to the specific embodiment of the invention in the drawings, the signal detector shown in FIG. 1 is generally designated 20. FIG. 6 shows it assembled in a working position on a support member carried by the frame, such as one tubular leg 22 of a bicycle front fork which is not otherwise illustrated in the drawings.

The signal detector 20 includes a head 24, sensor means 28, and a flexible strap 30. The head 24 and strap 30 will preferably be molded in one piece of a suitable, durable plastics material such as nylon.

As best shown in FIGS. 2 and 7, the head 24 comprises a housing 26 and has a lower, inwardly-open-sided compartment 32; and an upper, strap-receiving passageway 34, rectangular in cross section as shown in FIG. 5, defined by an upper, strap-guiding wall 36, a lower wall 37, opposite side walls 38,38, and strap entrance and exit portions 39 and 41 respectively. As best shown in FIG. 7, entrance portion 39 is adjacent the abutment surface 58 and exit portion 41 is remote from the abutment surface 58.

The sensor means 28 may be an electrical sensor coil shown in phantom lines in FIGS. 2, 6, and 7. Alternatively, it may be any equivalent sensing means such as a reed switch for detecting movement of an adjacent wheel-carried magnet (not shown). An electrical conductor means 29 comprising an insulated cable 29 with one or more electrical conductors connects the sensor 28 to a handlebar mounted computer (not shown).

Molded integrally with the head is a pawl generally designated 40. This comprises a horizontal plate portion 42 extending cantileverly rearwardly from a fixed end portion 44 connected to the head only through a curved, hinged, integral plastics portion 47 of the head housing 26. The pawl is located intermediate the upper and lower walls 36 and 37 with spaces 46 and 48 above and below it. Tooth means comprising in the present case, a single tooth 50, is molded integrally on the top of the pawl. The hinged portion 47 is suitably elastically flexible to enable movement of the pawl between a locked position shown in solid lines in FIG. 7, and an unlocked or released position shown in broken lines in that figure. At the free end portion 45, the pawl has an upper shoulder 52 which may be engaged by a tool such as a screwdriver 54 to move the pawl downward to its released position shown in broken lines as will be described.

The strap 30 will preferably be molded simultaneously with the head housing 26, in the extended position shown in FIG. 1. It will be notched as shown at 56, where it is attached to the housing, to facilitate bending to thereby lend itself flexibly to the support leg or tube 22 as shown in FIG. 6. For this purpose, the housing 26 is also molded with an abutment surface 58 which in the present case is curved to fit a support member carried by the frame, such as the tubular leg 22 of the bicycle front fork shown in FIG. 6, or a rear stay tube (not shown).

As best shown in FIGS. 7 and 8 the profile of the pawl tooth 50 is generally similar to the profile of the individual teeth 60 which are molded into the inner side of the strap. The tooth surfaces are in effect ratchet surfaces enabling relatively easy insertion of the strap into the strap-receiving passageway 34, and either locking the strap against withdrawal, or making it relatively difficult to withdraw.

The surfaces 62 on the strap teeth 60 engage the surface 64 on the pawl when the strap is inserted. As shown in FIG. 8, the root angle of the strap teeth is 60° while the tip angle of the pawl tooth is 55°. This slight relief provides clearance to enable positive seating of the pawl tooth between the strap teeth. Inasmuch as both of these surfaces 62 and 64 have a substantial slope relative to a line transverse to the strap (60° for surfaces 62 and 55° for surface 64) the strap may be inserted easily into the passageway 34.

On the other hand, the back surfaces 66 and 68 on the strap teeth and pawl are substantially transverse (at right angles) to the plane of the strap. These surfaces engage when an attempt is made to withdraw the strap and effectively lock the strap against casual or unintended withdrawal.

As best shown in FIGS. 6 and 7, the strap 30 is held upwardly against the strap-guiding surface wall 36 by the upward urgence of the elastic pawl 50. That strap-guiding wall 36 is positioned to guide the strap rearwardly from the housing in a direction tangent to the curved abutment surface 58, enabling the strap to wrap smoothly and firmly about the similarly curved bicycle fork tube 22.

The signal detector 20 is assembled on the fork tube 22 simply by positioning it adjacent the path of a magnet (not shown) carried by wheel spokes, and pulling the strap tight (left-wise in FIGS. 6 and 7). This inserting movement of the strap is quite easy due to the low angle of tooth surfaces 62 and 64. During insertion, the pawl clicks up and down between the solid line and broken line positions shown in FIG. 7.

The signal detector 24 is positively held in place because the relatively steep angle of the teeth 66 and 68 locks the strap against withdrawal.

The signal detector can be removed without destroying the strap, for reuse on the same bicycle or elsewhere by inserting a tool such as the screwdriver 54 through an enlarged portion 35 of the strap receiving passageway 34, and then pressing down on the pawl shoulder 52. By holding the pawl downward in the broken line position shown in FIG. 7, the strap is released and may easily be withdrawn.

The above described arrangement is illustrative of many possible specific embodiments of the invention. Numerous and varied other arrangements can readily be devised in accordance with the principles disclosed in this description without departing from the spirit and scope of the invention.

The embodiments of the invention in which an exclusive property or privilege is claimed are defined as follows:

1. A signal detector for a cycle computer adapted to be releasably mounted on the frame of a bicycle to detect wheel or sprocket turns, comprising:
    a head, sensor means supported by the head, and a flexible strap connected at one end of the head;
    said head comprising a housing having an abutment surface adapted to bear against a support member carried by the frame;
    said head having a strap-receiving passageway extending through the housing tangent to said abutment surface with a strap entrance portion adjacent the abutment surface and a strap exit portion remote from the abutment surface;
    said strap-receiving passageway extending between upper and lower walls, the upper wall having a strap-guiding surface;
    said strap having transverse teeth along the inside surface thereof facing inwardly into the passageway when the strap is inserted therein along the strap-guiding surface;
    said head having a pawl in said passageway extending cantileverly rearwardly from a fixed end portion connected to said head through an elastic hinge portion, tooth means extending transversely from the pawl for engagement with the teeth on the strap when the strap is inserted in the passageway, said pawl having a free rear end portion with a shoulder extending rearwardly from the tooth means, said shoulder being parallel to and offset inwardly from the strap sufficiently to provide an upper space between the shoulder and the strap into which a screwdriver-like tool may be inserted through said exit portion to disengage the tooth means on the pawl from the teeth on the strap to facilitate withdrawal of the strap from the passageway, a lower space between the lower wall and the pawl rear end portion providing room to receive the pawl rear end portion when displaced therein by such screwdriver-like tool, and said pawl rear end portion being wholly contained within said passageway beneath said upper wall and accessible only through said exit portion of the passageway.

2. A signal detector for a cycle computer according to claim 1 in which the abutment surface is curved to fit against the outside of a tubular support member carried by the frame such as a bicycle fork leg.

3. A signal detector for a cycle computer according to claim 1 in which opposite surfaces of the teeth on the strap are in effect ratchet surfaces with different orientations enabling relatively easy insertion of the strap into the strap-receiving passageway and relatively more difficult withdrawal of the strap.

* * * * *